Figure 1:
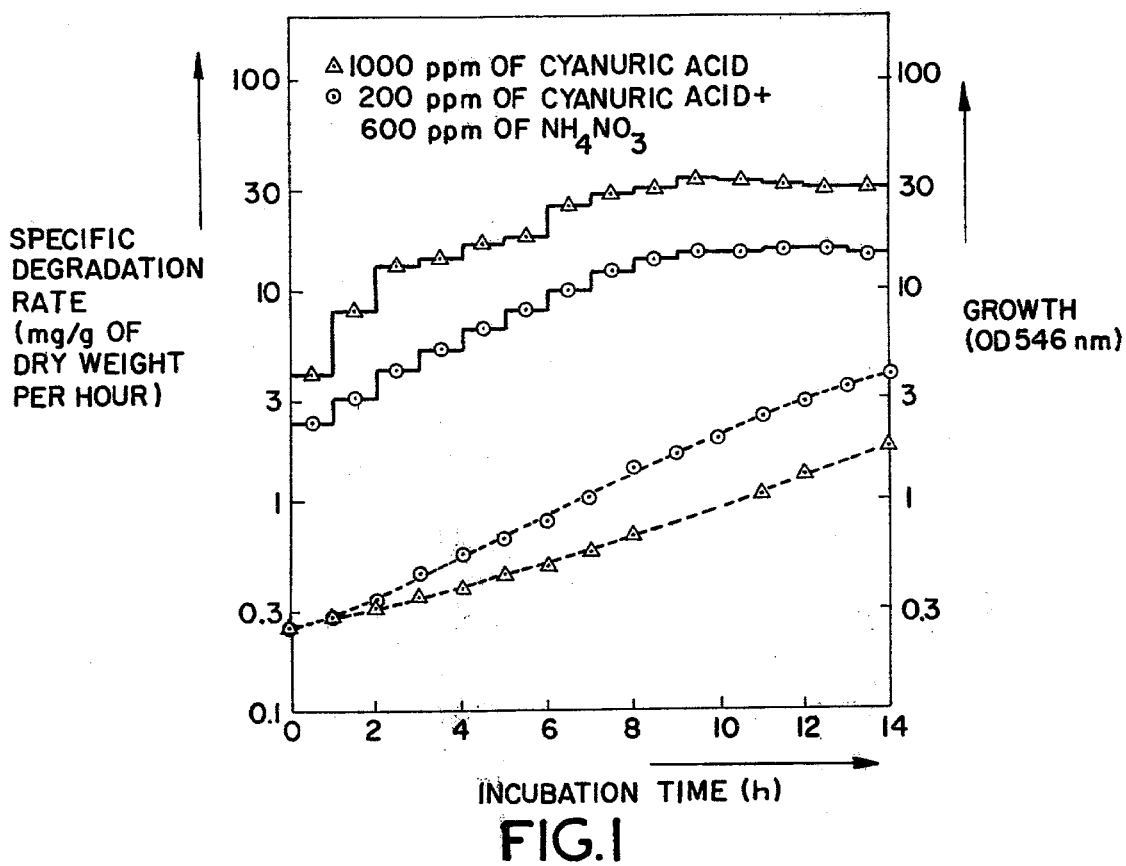

United States Patent [19]

Zeyer et al.

[11] 4,274,955
[45] Jun. 23, 1981

[54] PROCESS FOR THE DEGRADATION OF CYANURIC ACID

[75] Inventors: Josef Zeyer, Zürich; Ralf Hütter, Gockhausen; Peter Mayer, Basel, all of Switzerland

[73] Assignee: Ciba-Geigy Corporation, Ardsley, N.Y.

[21] Appl. No.: 46,123

[22] Filed: Jun. 6, 1979

[30] Foreign Application Priority Data

Jun. 15, 1978 [CH] Switzerland .................. 6532/78

[51] Int. Cl.$^3$ .............................................. C02F 3/34
[52] U.S. Cl. .................................. 210/612; 435/911
[58] Field of Search .......................... 210/2, 11, 15, 12; 435/911, 171

[56] References Cited

U.S. PATENT DOCUMENTS

| | | | |
|---|---|---|---|
| 3,105,014 | 9/1963 | Harrison | 210/2 X |
| 3,660,278 | 5/1972 | Mimura et al. | 210/11 |
| 3,926,795 | 12/1975 | Saldick | 210/11 |
| 3,940,332 | 2/1976 | Kato | 210/2 |

Primary Examiner—Thomas G. Wyse
Attorney, Agent, or Firm—Frederick H. Rabin

[57] ABSTRACT

The invention relates to a microbial process for the degradation of cyanuric acid in waste water containing cyanuric acid. The essential feature of the process is that a fungus of the Sporothrix genus, particularly a fungus of the *Sporothrix schenkii* variety is used for degrading the cyanuric acid. According to a variant of the process, it is possible to degrade, in addition to cyanuric acid, also any ammeline and ammelide present by using, besides a fungus of the Sporothrix genus, a second microorganism which is compatible with the fungus and which effects degradation of ammeline and ammelide to cyanuric acid. Waste water such as that accumulating in the commercial production of triazine herbicides can be purified by the process according to the invention.

11 Claims, 2 Drawing Figures

PROCESS FOR THE DEGRADATION OF CYANURIC ACID

The present invention relates to a microbial process for the degradation of cyanuric acid in waste water containing cyanuric acid.

In the production of triazine herbicides, for example 2-ethylamino-4-isopropylamino-6-chloro-s-triazine (atrazine), 2,4-bis-ethylamino-6-chloro-s-triazine (simazine) or 2,4-bis-isopropylamino-6-chloro-s-triazine (propazine) by reaction of cyanuric chloride with appropriate alkylamines, waste water accumulates which contains, besides the desired herbicidal active substance, 2,4,6-trisalkylamino-s-triazine, hydroxyalkylamino-s-triazines and cyanuric acid. The degradation of these compounds is essential for ecological reasons.

It is known that alkylamino-s-triazines can be oxidatively dealkylated (J. Agr. Food Chem. 19 (3), 572–573 (1971). The amino-s-triazines formed in the process can be degraded further, by hydrolysis in an acid medium, to cyanuric acid, which cannot be further degraded hydrolytically.

Alkylamino-s-triazines of the aforementioned type can also be split directly, by energetic hydrolysis in an acid medium, into cyanuric acid and alkylamine (Journal of Chromatography 100, 175–179 (1974).

Furthermore, a report concerning the biological degradation of 2,4-bis-alkylamino-6-chloro-s-triazines to ammelide (J. Agr. Food Chem. 13, 369 (1965)) has already been published.

The degradation of impurities such as are present in waste-water from plants producing triazine herbicides leads therefore with application of the prior known chemical methods merely to cyanuric acid. Using the aforementioned biological process for degrading 2,4-bis-alkylamino-6-chloro-s-triazines, there is however obtained, as the final product of degradation, ammelide, which renders necessary a subsequent chemical hydrolysis to cyanuric acid.

It is moreover known that cyanuric acid can be microbiologically degraded. Thus, for example, there is described in Arch. Microbiol. 67, 1–5 (1969) the degradation of cyanuric acid by means of strains of the fungus genera Penicillium and Hormondendrum. These fungi can utilise cyanuric acid, on a glucose-containing mineral salt medium, as sole nitrogen source. According to experimental data, there is a mean degradation rate of about 0.7 to 1.2 mg of cyanuric acid per g of dry weight (of the culture) per hour. In J. Environm. Qual. 4(1), 134–319 (1975), the degradation of cyanuric acid in sandy loam soils and in cultures is described. There was observed in cultures, within 16 to 32 days, a 90 to 96% degradation of cyanuric acid by Stachybothrys chartarum and Hendersonula toruloidea. On the basis of the experimental data, the mean degradation rate is about 0.08 mg of cyanuric acid per g of dry weight per hour.

It has already been suggested also to degrade cyanuric acid by means of bacteria. Thus, in the German Offenlegungsschrift No. 2,521,842 is described an anaerobic process for degrading cyanuric acid, which process uses bacteria from material from sewage-treatment plants, from activated sludges from sewage-treatment plants, from naturally occurring sources of water and from soils, at temperatures below 50° C. According to the experimental data, there is a mean degradation rate of about 0.24 to 1.5 mg of cyanuric acid per g of dry weight per hour. Reference is made in this connection also to Appl. Microbiol. 28, 1004–1008 (1974), where the same authors report on the anaerobic bacterial degradation of cyanuric acid. From the data given herein, there is shown a mean rate of degradation of about 0.3 to 2.4 mg of cyanuric acid per g of dry weight per hour.

The aforementioned processes for the microbial degradation of cyanuric acid are for practical purposes unsatisfactory since their degradation rate is too low or because the processes have to be carried out under anaerobic conditions. A further disadvantage of the known processes is that only cyanuric acid can be degraded, whilst ammeline and ammelide simultaneously present are not degraded.

It is therefore the object of the present invention to provide an aerobic microbial process for degrading cyanuric acid, which process has a degradation rate which is adequate for practical purposes, so that the cyanuric acid contained in the waste water can be degraded rapidly and completely.

A further object of the present invention is to provide a process by which the mixture obtained after dealkylation, consisting of cyanuric acid, ammeline and ammelide, can be microbially degraded directly without prior hydrolysis of ammeline and ammelide to cyanuric acid.

Figure 2:
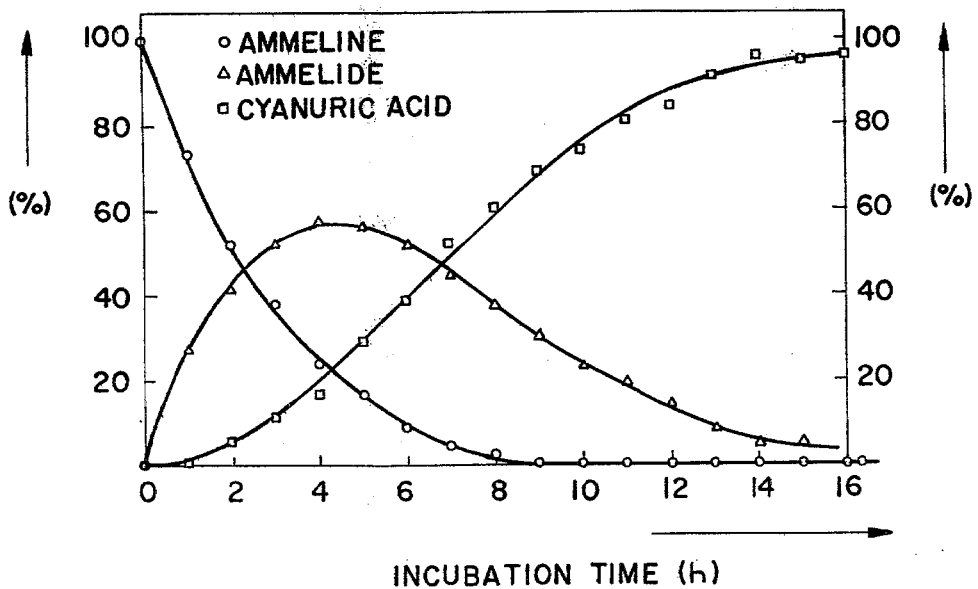

FIGS. 1 and 2 show degradation rates according to the present invention.

It has now been found that fungi of the genus Sporothrix can utilise cyanuric acid as sole nitrogen source, with the cyanuric acid being degraded to carbon dioxide.

The process according to the invention for degrading cyanuric acid in waste water containing cyanuric acid is characterised in that the waste water containing cyanuric acid is brought into contact, under aerobic conditions, with cultures of fungi of the genus Sporothrix.

Suitable fungi of the genus Sporothrix are in particular fungi of the species Sporothrix schenkii. Especially suitable strains of this species are CBS 472.48, CBS 359.36 and NRRL Y-11307. The strain Sporothrix schenkii 6.2 NRRL Y-11307 is particularly suitable.

The strain Sporothrix schenkii 6.2 NRRL Y-11307 was isolated from sewage sludge of waste liquors of processing plants for producing triazine herbicides of Ciba Geigy AG, Werk Kaisten. The strain, belonging to Fungi imperfecti, can be described morphologically as follows:

GROWTH ON PLATES

On a mineral salt medium, to which has been added 0.06 percent by weight of ammonium nitrate, 0.2 percent by weight of yeast extract, 0.05 percent by weight of glucose and 2 percent by weight of agar, the fungus grows within 1 day at 30° C. to colonies of about 1 to 2 mm in size. After three days the colonies attain a size of about 6 to 8 mm. The colonies initially appear smooth, but soon develop a velvety and fine grained structure. Two types of colonies can occur, namely colonies having a strong aerial mycellium formation and colonies having a weak aerial mycellium formation. The colonies having a weak aerial mycellium formation are pale yellowish-orange to yellowish-brown in colour, fairly smooth and slightly wrinkled, and exhibit a fading outer edge. The colonies having a strong aerial mycellium formation have whitish conical aerial mycellium structures.

There is found to be no specific formation of odorous substances.

The strain grows morphologically in agar as relatively slightly branched mycellium with the main hyphae running mostly in straight lines and the secondary hyphae frequently branching off almost vertically. The hyphae have a thickness of 1 to 2 (up to 3) μmm. The conidiogenic hyphae occur in scattered form, and are formed orthotropically from undifferentiated hyphae. They are linea and of varying size, broader in the vicinity of the base and fading towards the end. They are usually about 10 to 40 μm long and about 2 to 4 μm wide. Apically, conidia are mostly abstricted on one to several conidiabearing cylindrical denticles by sympodial growth. The conidia are hyaline, smooth- and thin-walled, elongated, elipsoid-oval to almost thread-like and usually 2–6×1.5–3 μm in size.

GROWTH IN SUBMERGED CULTURE

In a submerged culture using a mineral salt medium to which have been added 0.06% by weight of ammonium nitrate, 0.2 percent by weight of yeast extract and 0.5 percent by weight of glucose, the fungus grows hyalinely and is pale beige-orange or slightly brownish in colour, with hyphae of about 1 to 3 μm in thickness. Conidiogenic cells occur in scattered form, but in most cases abundantly. The conidia formation is very strong. Secondary conidia formation is also to be observed. The morphology of the hyphae, of the conidiogenic cells and of the conidia in the submerged culture are very similar to the type of growth observed on agar plates.

The degradation according to the invention of the cyanuric acid present in the waste water using fungi of the genus Sporothrix can be performed in various ways, namely:

(a) with growing cells,
(b) with dormant cells,
(c) with immobilised cells, and
(d) with immobilised enzyme preparations produced from cultures of fungi of the Sporothrix genus.

The fungi of the Sporothrix genus which are to be used according to the invention are firstly grown on a suitable base medium, and then added to the waste water. A suitable base medium is made up for example as follows:

| | |
|---|---|
| potassium dihydrogen phosphate | 0.30 g/l |
| disodium hydrogen phosphate-dodecahydrate | 2.00 g/l |
| magnesium sulfate heptahydrate | 0.05 g/l |
| calcium chloride dihydrate | 0.05 g/l |
| diverse trace elements | 3.4 mg/l. |

The base medium, after the addition of 0.5 percent by weight of glucose or saccharose, is used to grow the fungi.

The individual, above-mentioned methods (a) to (d) for degrading cyanuric acid using fungi of the Sporothrix genus are carried out as follows:

(A) DEGRADATION OF CYANURIC ACID USING GROWING CELLS

The degradation of cyanuric acid using growing cells is performed by inoculating the waste water with a fungus of the Sporothrix genus. In particular cases, where necessary, phosphates and further sources of carbon and nitrogen have to be added in order to ensure a good growth of the fungus. Suitable carbon sources are types of sugar, for example glucose, saccharose or molasses. Suitable nitrogen sources are nitrogen compounds, such as ammonium nitrate, urea, biuret, sodium nitrate and ammonium chloride. The specific degradation rate is at its best when cyanuric acid serves as the only nitrogen source.

(B) DEGRADATION OF CYANURIC ACID USING RESTING CELLS

The employed fungus is pre-grown on a suitable base medium, which contains as sole nitrogen source cyanuric acid, and as carbon source a sugar, for example glucose, saccharose or molasses. The fungus grown in this manner is gathered and is introduced into the waste water containing cyanuric acid.

(C) DEGRADATION OF CYANURIC ACID USING IMMOBILISED CELLS

The fungus pre-grown as described under (b) is applied to a suitable carrier on which it can be fixed by a chemical or physical bond. Suitable carriers are for example: polyacrylamide gels, such as N,N'-methylene-bis-acrylamide and diacrylamide-dimethyl ether, and also N',N'-diallyltartardiamide. The carrier loaded with the fungus is then brought into contact with the waste water containing cyanuric acid, for example in a column. This procedure is particularly suitable for performing the process continuously.

(D) DEGRADATION OF CYANURIC ACID USING ENZYME PREPARATIONS

The fungus pre-grown as under (b) is harvested and is opened by customary methods, for example by ultrasonics or by a French press. The enzyme preparation obtained in this way is fixed on a suitable carrier, suitable carriers being silica gel, DEAE-Sephadex, and cellulose activated by cyanogen bromide. The carrier loaded with the enzyme preparation is then brought into contact, for example in a column, with the waste water containing cyanuric acid. This procedure is likewise suitable for performing the process continuously.

The degradation according to the invention of cyanuric acid using a fungus of the Sporothrix genus can be carried out at temperatures of 5° to 35° C., preferably at 25° to 35° C. Degradation using growing cells according to variant (a) is advantageously performed at 20° to 35° C., preferably at 30° C.

The salt content of the waste water to be purified is not critical. For example, 2 percent by weight of sodium chloride does not impair the degradation rate. The concentration of cyanuric acid can be up to 0.3 percent by weight (solubility limit). The presence of other triazine compounds does not disadvantageously affect the carrying out of the process according to the invention.

When the waste water contains ammeline and ammelide besides cyanuric acid, an advantageous variant of the process according to the invention comprises using for degrading these compounds, in addition to a fungus of the Sporothrix genus, a second microorganism which is compatible with the fungus and which effects the degradation of ammeline and ammelide to cyanuric acid. A suitable microorganism of this kind is *Pseudomonas sp. B* NRRL B-11308. This genus is compatible with fungi of the Sporothrix genus and is capable of forming mixed cultures.

The genus *Pseudomonas sp.* 123 *B* NRRL B-11308 was isolated from sewage sludge from waste liquors of processing plants for the production of triazine herbicides of Ciba-Geigy AG, Werk Kaisten. It is presumably a gram-negative species of bacteria, which was classified under the genus Pseudomonas. The growth test on "Oxi/Ferm tubes" and "Entero tubes" (Hoffmann La Roche and Co., Basle) produced only in the case of urea and citrate a positive reaction, that is to say, the strain is capable of splitting urea and utilising citrate. It was furthermore established that the strain grows well on glucose, but very poorly on saccharose. Ammonium nitrate, N-ethylurea, urea and biuret act as good nitrogen sources, whereas on barbituric acid and uracil only a very poor growth is to be observed. The strain can be described morphologically as follows:

GROWTH ON PLATES

On a mineral salt medium, to which have been added 0.06 percent by weight of ammonium nitrate, 0.2 percent by weight of yeast extract, 0.5 percent by weight of glucose and 2 percent by weight of agar, the strain grows at 30° C. within one day to colonies 0.5 to 1 mm in size. After three days, the colonies attain a size of 3 to 5 mm. The colonies have an orange-beige colour and a sharply defined edge. They are not structured and appear slightly convex, smooth, lustrous and watery. These properties scarcely change in the course of the growth of the colonies.

The mixed culture formed of *Sporothrix schenkii* NRRL Y-11 307 and *Pseudomonas sp.* 123 B NRRL B-11308 has proved particularly suitable for purifying waste water which contains ammeline and ammelide in addition to cyanuric acid.

The process according to the invention is distinguished, compared with known microbial processes for degradation of cyanuric acid, by a considerably improved degradation rate. Thus, with the use of fungi of the genus Sporothrix, degradation rates of 20 to 30 mg of cyanuric acid per g of dry weight per hour are achieved. Short treatment times are made possible by virtue of this degradation rate. A further advantage of the process according to the invention is that by using mixed cultures it is also possible to purify waste water containing ammeline and ammelide in addition to cyanuric acid. Another advantage of the process according to the invention is finally that fungi both of the genus Sporothrix and of the genus *Pseudomonas sp.* 123B NRRL B-11308 utilise nitrate ions and ammonium ions as a nitrogen source and remove them from the waste water.

The process according to the invention is further illustrated by the Examples which follow.

EXAMPLE 1

Degradation of cyanuric acid to carbon dioxide using growing cells of *Sporothrix schenkii* 6.2 NRRL Y-11307

A specimen of the strain *Sporothrix schenkii* 6.2 NRRL Y-11307, taken from a stationary culture, is inoculated into a base medium of the composition

| potassium dihydrogen phosphate | 0.30 g/l |
| disodium hydrogen phosphate dodecahydrate | 2.00 g/l |
| magnesium sulfate heptahydrate | 0.05 g/l |
| calcium chloride dihydrate | 0.05 g/l |
| diverse trace elements | 3.4 mg/l, | which contains 0.5 percent by weight of glucose and 1000 ppm of $^{14}$C-labelled cyanuric acid. At one hour intervals are taken specimens in which the relative amount of fungus is determined by measurement of the optical density (OD 546 nm), and the amount of residual cyanuric acid by thin-layer chromatography and radioactive balancing.

The test results are shown in FIG. 1 of the drawings, wherein the continuous curve relates to the specific degradation rate, and the dashed curve to the growth, expressed by the optical density at 546 nm.

The test is repeated using 200 ppm of $^{14}$C-labelled cyanuric acid and additionally 600 ppm of ammonium nitrate. The results obtained in this case too are shown in the following diagram, where again the continuous curve relates to the specific degradation rate, and the dashed curve to the growth, expressed by the optical density at 546 nm.

EXAMPLE 2

Degradation of ammeline to cyanuric acid by means of *Pseudomonas sp.* 123 B NRRL B-11308

A specimen of *Pseudomonas sp.* 123 B NRRL B-11308 is left to grow on an enriched medium consisting of a basal medium of the composition given in Example 1, glucose (1 percent by weight) and yeast extract (0.5 percent by weight) with 20 ppm of ammeline. After attainment of the stationary growth phase (OD 546 nm=20.0), 5 ppm of $^{14}$C-labelled ammeline is added to the culture. There are subsequently taken from the culture, at intervals of one hour, specimens in which the metabolite distribution is determined by means of thin-layer chromatography. The test results are summarised in FIG. 2 of the drawings.

EXAMPLE 3

Degradation of ammeline to $CO_2$ using mixed cultures of the strains *Sporothrix schenkii* 6.2 NRRL Y-11307 and *Pseudomonas sp.* 123 B NRRL B-11308

The strains *Sporothrix schenkii* 6.2 NRRL Y-11307 and *Pseudomonas sp.* 123 B NRRL B-11 308 are left to grow on an enriched medium consisting of the basal medium given in Example 1, 1 percent by weight of glucose and 0.5 percent by weight of yeast extract, and diluted with the same medium to an optical density OD 546 nm of 1. From the mixture obtained is produced, for inoculation, a mixture series in which the proportion of *Pseudomonas sp.* 123 B NRRL B-11 308 decreases in steps of 10% from 100% to 0%, and, correspondingly, the proportion of *Sporothrix schenkii* 6.2 NRRL Y-11 307 increases from 0% to 100%. The resulting individual mixtures are then inoculated onto fresh nutrient medium containing 2.5 ppm of $^{14}$C-labelled ammeline, with the inoculated amount corresponding to one tenth of the culture obtained. After 2 days, the residual radioactivity of the individual mixtures is determined. The test results are shown in the Table which follows.

| % Pseudomonas sp. 123 B | 100 | 90 | 80 | 70 | 60 | 50 | 40 | 30 | 20 | 10 | 0 |
| --- | --- | --- | --- | --- | --- | --- | --- | --- | --- | --- | --- |
| % *Sporothr. schenkii* 6.2 | 0 | 10 | 20 | 30 | 40 | 50 | 60 | 70 | 80 | 90 | 100 |
| % residual radioactivity | 100 | 0 | 0 | 0 | 0 | 0 | 0 | 0 | 0 | 0 | 100 |

What is claimed is:

1. A microbial process for the degradation of cyanuric acid in waste water containing cyanuric acid, in which process the waste water containing cyanuric acid is brought into contact, under aerobic conditions, with cultures of fungi of the *Sporothrix schenkii* species.

2. A process according to claim 1, wherein the fungi of the *Sporothrix schenkii* species used are the strains CBS 472.48 and NRRL Y-11 307.

3. A process according to claim 2, wherein the fungus of the *Sporothrix schenkii* species used is the strain *Sporothrix schenkii* 6.2 NRRL Y-11 307.

4. A process according to claim 1, wherein the waste water containing cyanuric acid is inoculated with a fungus of the *Sporothrix schenkii* species, and the degradation of the cyanuric acid is carried out with growing cells of the fungus of the *Sporothrix schenkii* species.

5. A process according to claim 1, wherein the waste water containing cyanuric acid is inoculated with a fungus of the *Sporothrix schenkii* species, and the degradation of the cyanuric acid is carried out with dormant cells of the fungus of the *Sporothrix schenkii* species.

6. A process according to claim 1, wherein the degradation of the cyanuric acid contained in the waste water is carried out with immobilised cells of a fungus of the *Sporothrix schenkii* species.

7. A process according to claim 1, wherein the degradation of the cyanuric acid contained in the waste water is carried out with immobilised enzyme preparations produced from cultures of fungi of the *Sporothrix schenkii* species.

8. A process according to claim 1, wherein the degradation of the cyanuric acid contained in the waste water is performed at temperatures of 5° to 35° C.

9. A process according to claim 8, wherein the degradation of the cyanuric acid contained in the waste water is performed at temperatures of 25° to 35° C.

10. A microbial process for purifying waste water containing ammeline and ammelide in addition to cyanuric acid, in which process this waste water is brought into contact with a mixed culture of a fungus of the *Sporothrix schenkii* species and a second microorganism which is compatible with the fungus and which effects degradation of ammeline and ammelide to cyanuric acid.

11. A process according to claim 10, wherein a mixed culture of the strain *Sporothrix schenkii* 6.2 NRRL Y-11 307 and of *Pseudomonas sp.* 123 *B* NRRL B-11308 is used.

* * * * *